United States Patent [19]

Dobson

[11] 4,418,734
[45] Dec. 6, 1983

[54] SAFETY SUPPORT SYSTEM

[75] Inventor: Robert L. Dobson, Tallmadge, Ohio

[73] Assignee: The Goodyear Tire & Rubber Company, Akron, Ohio

[21] Appl. No.: 359,772

[22] Filed: Mar. 19, 1982

[51] Int. Cl.³ .............................................. B60C 17/00
[52] U.S. Cl. .................... 152/158; 152/318; 152/330 RF; 152/330 L; 152/400; 152/401
[58] Field of Search ............ 152/158, 330 L, 330 RF, 152/152, 157, 155, 318, 310–314, 349, 350, 381.3, 381.6, 393, 395, 398, 400, 401, 406–408

[56] References Cited

U.S. PATENT DOCUMENTS

| | | | |
|---|---|---|---|
| 3,060,990 | 10/1962 | Howard | 152/342 |
| 3,195,601 | 7/1965 | Travers | 152/313 |
| 3,208,497 | 9/1965 | Schutt | 152/157 |
| 3,509,928 | 5/1970 | Aghnides | 152/158 |
| 3,574,317 | 4/1971 | Brewer | 152/313 |
| 3,650,865 | 3/1972 | Hawkes et al. | 156/119 |
| 3,794,706 | 2/1974 | Christie et al. | 264/45 |
| 3,814,158 | 6/1974 | Ryder | 152/158 |
| 3,872,201 | 3/1975 | Paul et al. | 264/55 |
| 4,183,388 | 1/1980 | Cassidy | 152/158 |
| 4,334,565 | 6/1982 | Stokes | 152/158 |

Primary Examiner—William A. Powell
Assistant Examiner—Thomas Bokan
Attorney, Agent, or Firm—Frederick K. Lacher; H. C. Young, Jr.

[57] ABSTRACT

A safety support system in which an annular safety support of resilient foam material having an outer diameter less than the inner diameter of the tire is positioned around a rim and within the tire. The foam material has closed cells containing gas under pressure for supporting the tire in the deflated condition and expanding in an axial direction to press the bead portions against the bead seats of the rim. The safety support has beads and a fabric reinforced construction at a radially outer wall for controlling expansion beyond the radially outer diameter. A second reinforcing fabric ply may be provided at the radially inner wall for controlling expansion and facilitating field mounting of the safety support.

9 Claims, 4 Drawing Figures

SAFETY SUPPORT SYSTEM

This invention relates generally, as indicated, to a system in which a safety support is positioned within a wheel rim inside a tire chamber to provide support and cushioning with the tire in a deflated condition. The invention is especially applicable to military vehicles where the tires may be deflated by bullets shot through the walls of the tires.

Heretofore tire, safety support and rim assemblies have been devised for supporting tires in the deflated condition; however, there have been problems caused by the rotation of the tire bead portions relative to the rim due to the torque on the deflated tire. This sliding movement may cause failure of the tire at the bead portions and an unstable support of the vehicle.

In accordance with this invention there is provided a system in which an annular safety support body of resilient foam material contains cells of gas under pressure for pressing the bead portions of the tire against the rim with sufficient force to prevent rotation of the tire when it is operated in the deflated condition. The safety support body has a reinforced construction for confining the safety support body and controlling the shape of the safety support in the deflated and inflated conditions of the tire.

The pressure in the safety support body will be maintained even through some of the cells of the foam are punctured or cut. The reinforced construction of the safety support controls the expansion of the safety support body for maintaining a predetermined outer diameter which is less than the radially inner diameter of the tire tread portion during operation in the inflated condition. Provision may also be made to control expansion of the radially inner wall of the safety support body and thereby facilitate assembling the safety support with the tire and rim in the field.

In accordance with one aspect of the invention there is provided a safety support system for a tire and rim assembly in which the tire is a tubeless tire having a tread, sidewalls and bead portions mounted on bead seats of a rim comprising a safety support with a toroidal safety support body of resilient foam material for positioning within said tire, said safety support having a predetermined radially outer diameter less than the radially inner diameter of said tire, means to control expansion of said safety support beyond said outer diameter, said safety support body having a radially inner diameter substantially the same as the diameter of said rim, said resilient foam material of said safety support body containing cells of gas under pressure for expanding said body in an axial direction and exerting an axial force against said bead portions of said tire seated in said bead seats of said rim to provide cushioning and support of said tire and resist circumferential movement of said bead portions of said tire relative to said rim upon deflation of said tire chamber.

Other aspects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

Figure 1:
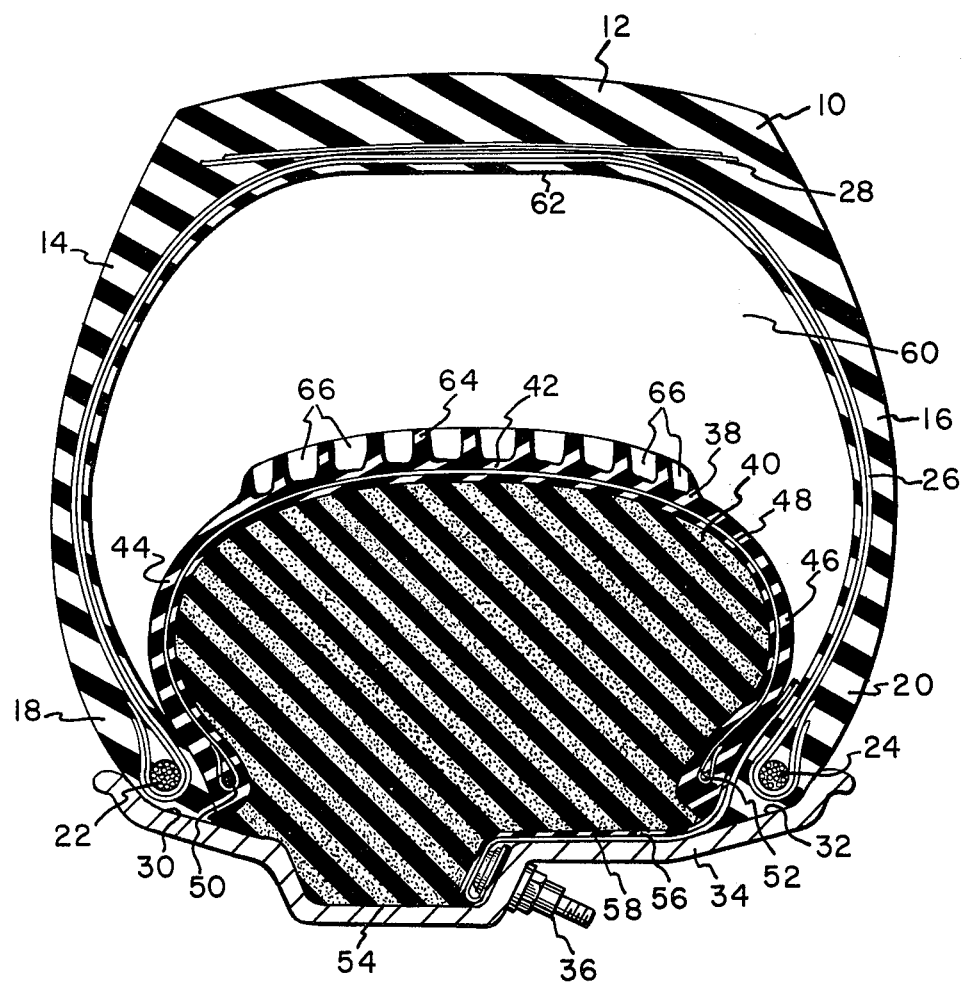
FIG. 1 is a cross-sectional view of one-half a tire and rim assembly embodying the invention taken along a radial plane containing the axis of te tire, rim and safety support body.

Referring to FIG. 1, a tire 10, which may be tubeless, is shown having a tread 12, sidewalls 14 and 16, and bead portions 18 and 20 containing bead rings 22 and 24 connected by reinforcing fabric plies 26 and having a reinforcing belt 28. The bead portions 18 and 20 of the tire 10 are seated on bead seats 30 and 32 of a rim 34 which is of substantially rigid material such as steel and of the drop center type. A tire valve 36 is mounted on the rim 34 for inflating the tire 10.

The safety support system of this invention includes a safety support 38 having a toroidal safety support body 40 of resilient foam material containing closed cells of gas under pressure. The safety support body 40 is contained by a radially outer wall 42 and sidewalls 44 and 46 of resilient rubberlike material reinforced by at least one ply 48 of reinforcing fabric wrapped around the radially outer wall and extending through the sidewalls to a pair of reinforcing bead rings 50 and 52 positioned at the surface of the safety support body 40 at each side of the body. The bead rings 50 and 52 preferably have a diameter not greater than the diameter of the bead portions 18 and 20 of the tire 10 for optimum stability of operation. The foam material of the safety support body 40 is retained at a radially inner wall 54 of the support body by the rim 34. The inner wall 54 of the body 40 has a configuration conforming substantially to the configuration of the drop center rim 34.

A flap 56, which may be fastened to the valve 36, extends from the valve to a position adjacent the sidewall 46 of the safety support 38 and has at least one groove 58 for communication between a tire inflation cavity 60 and the valve 36. The tire inflation cavity 60 is defined by the outer wall 42 of the safety support 38 and the inner surface 62 of the tire 10. The outer wall 42 of the safety support 38 has a radially outer diameter which is less than the radially inner diameter of the inner surface 62 of the tire 10. Preferably the section height of the safety support 38 is about sixty percent the section height of the tire 10. A tread portion 64 may be provided at the outer wall 42 of the safety support 38 and has holes 66 which may be used for retaining a lubricant (not shown).

The safety support system shown in FIG. 1 is preferably made and assembled at the factory. The tire 10, rim 34 and valve 36 may be typical commercial designs or modified to meet special requirements such as for military vehicles. The outer wall 42 and sidewalls 44 and 46 of the safety support 38 may be built on a cylindrical drum and then shaped and vulcanized to the tire configuration shown in FIG. 1 following procedures well known to those skilled in the art of tire manufacturing.

The safety support system may then be assembled by first inserting the safety support 38 in the tire 10. A predetermined amount of rubber containing a heat activatable blowing agent which may be in the form of a number of layered preform strips is positioned within the outer wall 42 and sidewalls 44 and 46. The flap 56 is installed and the valve 36 fastened to the rim 34. The bead portion 20 may then be buttonhole over the edge of the rim 34 followed by the buttonholing of the bead portion 18 of the tire 10 over the edge of the rim.

The closed cell structure of the safety support body 40 is formed by heat activating the blowing agent during a vulcanization process to simultaneously expand the solid material placed within the outer wall 42 and sidewalls 44 and 46 and around the radially inner wall 54 of the rim 34. Typical vulcanization temperatures range from about 90° C. to about 200° C. The safety support body 40 cell structure is required to be resilient in order to support the vehicle when the tire 10 is in the deflated condition and also exert an axial force against the bead portions 18 and 20 of the tire to resist relative circumferential movement of the tire and rim 34. The resiliency can be characterized by having a compressibility in the range of about one to about 800 pounds per square inch (psi) and preferably about one to about 100 psi at fifty percent compression at 25° C.

The cell structure typically has an unloaded specific gravity equal to about 0.60 to about 1.40, preferably about 0.80 to about 1.16. The term "unloaded specific gravity" relates to the structural material such as rubber without being loaded with pigments and fillers such as carbon black, silica, zinc oxide and oils. The amount of internal cell pressure desired is dependent upon the equivalent psi desired in the safety support 38. The tire shown in FIG. 1 is preferably inflatable to a pressure of from about 50 to 80 psi and the equivalent pressure in the safety support 38 is from about 60 to 115 psie.

The term air pressure equivalent (psie) or equivalent psi as used in this description refers to the pressure of air in an encasement such as an inflatable tire which has a load deflection curve corresponding to the load deflection curve of the safety support 38. Accordingly, the equivalent psi (psie) of the safety support 38 at a certain load deflection is the same as the air pressure (psi) of a corresponding encasement at the same load deflection.

After foaming of the safety support body 40 the force of the body pressure against the bead portion portions 18 and 20 of the tire 10 is preferably greater than the air pressure in the inflation cavity 60 by at least 15 psi.

The closed cell safety support body 40 can be of various cured or vulcanized rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulur cured or vulcanized natural rubber and synthetic rubber polymers are preferred such as natural rubber and cis-1,4-polyisoprene.

The blowing agents used in the practice of this invention for the manufacture of the safety support 38 are those which liberate gases upon heating. Representative examples of such agents are those which liberate gases such as nitrogen, carbon dioxide, ammonium bicarbonate and sodium bicarbonate and cause the formation of the integral closed cell internal layer. Usually agents which liberate nitrogen are preferred. Such blowing agents are compounds which give off gases upon being triggered by the vulcanization temperatures, representative of which are nitro, sulfonyl and azo compounds such as dinitrosopentamethylene tetramine, N,N'-dimethyl-N,N'-dinitrosophthalamide, azodicarbonamide, sulfonyl hydrazides such as benzenesulfonyl hydrazide, toluenesulfonyl hydrazide and p,p'-oxy-bis-(benzenesulfonyl)hydrazide and sulfonyl semicarbazides such as p-toluene sulfonyl semicarbazide and p,p'-oxy-bis-(benzenesulfonyl) semicarbazide). In this embodiment the rubber of a specially compounded rubber expanded as the blowing agent was heat activated during the vulcanization process to form an integral closed cell structure having a density of about 45 pounds per cubic foot and a compressibility of about 28 pounds per square inch (psi) at a fifty percent compression.

The reinforcing ply 48 may have cords of typical tire reinforcing cord material such as nylon, polyester or aramid and the angles of the cords relative to the centerplane of the tire may vary with the size of the tire, the section height and the equivalent psi forces in the safety support 38.

In operation, the tire 10 is inflated to a pressure of from about 50 to 80 psi and the vehicle operated in a condition where the inner surface 62 of the tread 12 of the tire is out of contact with the tread portion 64 of the safety support 38. Upon puncture of the tire 10 as by a bullet, the air will escape from the tire inflation cavity 60 and the inner surface 62 of the tread 12 will be supported on the tread portion 64 of the safety support 38. The bead rings 50 and 52 of the safety support 38 and the ply 48 will maintain the safety support in a stable position and the safety support body 40 of foam will provide cushioning as well as exert an axial pressure against the bead portions 18 and 20 of the tire 10 for resisting any relative circumferential movement of the tire and rim 34. Tires of this construction have provided satisfactory operation for a required distance after deflation of the tire 10.

Figure 2:
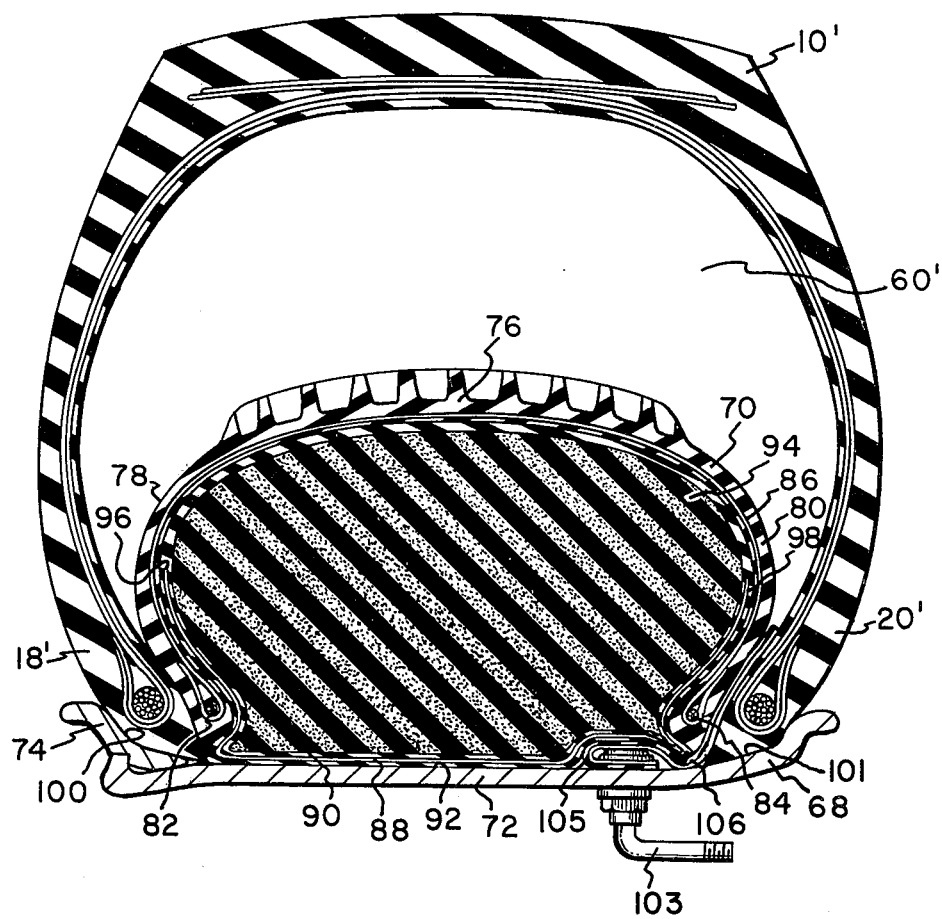
FIG. 2 is a sectional view like FIG. 1 showing a modified safety support which is field mountable on a two-piece cylindrical rim.

Referring to FIG. 2, a modified safety support system is shown in which the tire 10' is mounted on a two-piece rim 68 and a modified safety support 70 is field mountable. The two-piece rim 68 has a generally cylindrical member 72 and a split ring member 74 which can be mounted on the cylindrical member and removed in a manner well known to those skilled in the art.

The modified safety support 70 of FIG. 2 has an outer wall 76, sidewalls 78 and 80, and bead rings 82 and 84 connected by a ply 86 of reinforcing fabric wrapped around the radially outer wall. These elements of the safety support 70 are substantially the same as the corresponding elements for the safety support 38 shown in FIG. 1 and described hereinabove.

In addition to these elements the safety support 70 has a second ply 88 of reinforcing fabric wrapped around a radially inner wall 90 of a safety support body 94 and this ply may be embedded as by calendering in a liner 92 extending around the safety support body of foam material. The second ply 88 may have reinforcing cords extending at a generally bias angle to the centerplane of the tire 10' and safety support 70. The second ply 88 has a width greater than the distance between the bead rings 82 and 84 and has edges 96 and 98 which may terminate in the sidewalls 78 and 80 of the safety support 70.

The safety support body 94 is of a closed cell construction like that described for the support body 40 of FIG. 1. The cells have a predetermined gas pressure to provide resilience for cushioning the vehicle when the tire 10' is deflated and for pressing the bead portions 18' and 20' of the tire against the bead seats 100 and 101 of the rim 68 with a force preferably greater than the air pressure in the tire cavity 60' by 15 psi. A valve 103 is mounted in the cylindrical member 72 of the rim 68. A flap 105 is fastened to the valve 103 and extends between the sidewall 80 of the safety support 70 and the inner wall of the tire 10' to provide communication between the valve 103 and the tire inflation cavity 60' through a groove 106 in the flap.

The safety support system of FIG. 2 is especially useful for a tire 10' having a relatively low pressure of from about 20 to 30 pounds per square inch in the tire inflation cavity 60' during operation. The equivalent pressure in the safety support 70 may be from about 13 to 115 psie depending upon the strength of the reinforcing fabric of ply 88 extending across the inner wall for controlling the expansion of the safety support at the inner wall 90 so that the safety support may be mounted over the cylindrical member 72 of the two-piece rim 68. During operation in the deflated condition of the tire 10' the safety support 70 provides stable support for the vehicle and an axial force against the bead portions 18' and 20' to resist relative circumferential movement of the rim 68 and tire.

The safety support 70 is preferably manufactured separately from the tire 10' and rim 68. For example, the outer wall 76, sidewalls 78 and 80 including the bead rings 82 and 84 and the first reinforcing ply 86 may be built in a cylindrical form and then shaped and vulcanized following the procedures normally used for production of tires. The liner 92 containing the second ply 88 may be placed within the safety support 70 and a predetermined quantity of foamable rubber for the body 94 included within the liner. This assembly may then be placed in a suitable environment such as an autoclave and heated for a sufficient time to vulcanize the liner 92 and foam the body 94 providing an integral safety support construction.

Alternatively, the outer wall 76 and sidewalls 78 and 80 including the bead rings 82 and 84 and the first reinforcing ply 86 may be built and shaped in a toroidal form. At this point the liner 92 and second ply 88 may be applied to the inner surface of the safety support 70 with a predetermined quantity of foamable rubber for the body 94 contained within the liner. This assembly may then be placed in a mold and all of the parts covulcanized to provide the integral construction shown in FIG. 2. To provide the desired force against the bead portions 18' and 20', the safety support 70 may be vulcanized so that the spacing between the beads 82 and 84 is greater than the spacing in the assembled condition. This may be about one-half inch or an amount sufficient to provide the desired force after assembly.

Figure 3:
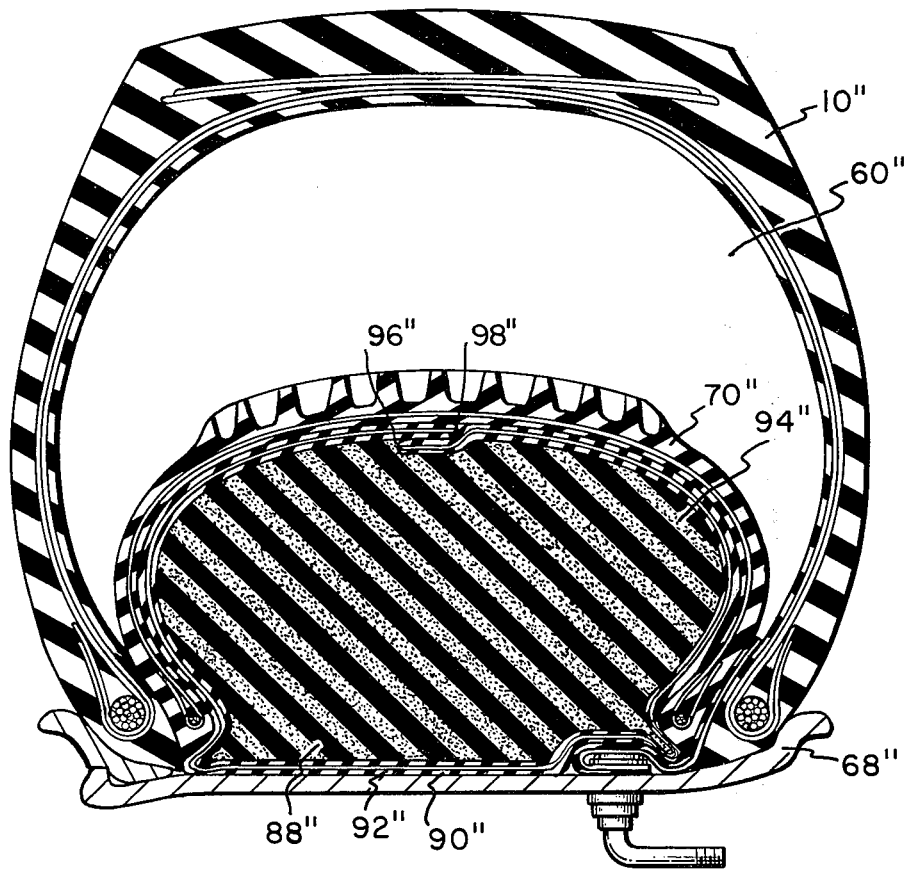
FIG. 3 is a sectional view like FIG. 2 showing a further modification in which the tire and safety support body are operable under high pressures.
Figure 4:
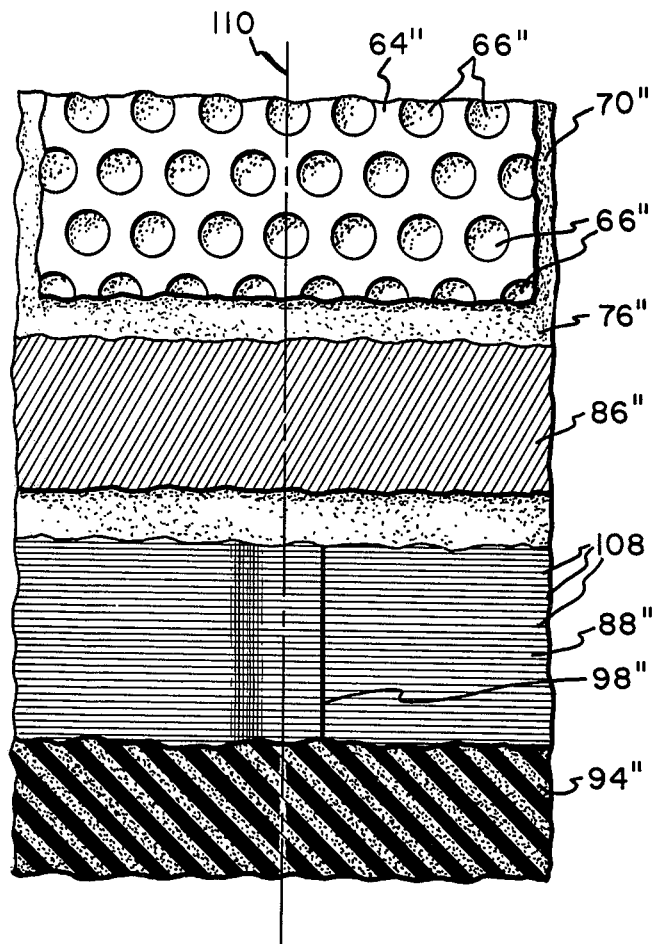
FIG. 4 is a fragmentary circumferential plan view of the safety support of FIG. 3 with parts being broken away to show the position of the cords in the reinforcing plies.

Referring to FIGS. 3 and 4, a further modification of the safety support system of this invention is shown in which the safety support 70" of FIG. 2 is further reinforced so as to be adapted for use within a tire 10" operable at pressures of from about 60 to 110 psi in the tire inflation cavity 60". The inner liner 92" contains a second ply 88" having cords 108 extending in a generally radial direction at about right angles to a centerplane 110 of the tire 10" and safety support 70" as shown in FIG. 4. The cords 108 may be of nylon, rayon, aramid or other suitable tire cord material depending upon the strength requirements. The circumferential edges 96" and 98" of the second ply 88" overlap to provide a continuous reinforcement completely encircling the body 94" of foam material in the safety support 70". With this construction the equivalent pressure within the safety support 70" may be from about 50 to 115 psie and at the same time the inner wall 90" is maintained at a diameter suitable for field mounting of the safety support 70" on the rim 68" and inside the tire 10". The safety support body 94" is of a closed cell construction like that described for the support body 40 of FIG. 1. The safety support 70" and the tire 10" may be assembled on the rim 68" in substantially the same manner as described hereinabove for the system of FIG. 2. The operation of this safety support assembly is similar to that described hereinabove for the safety support systems shown in FIGS. 1 and 2.

While certain representative embodiments and details have been shown for the purpose of illustrating the invention, it will be apparent to those skilled in this art that various changes and modifications may be made therein without departing from the spirit or scope of the invention.

What is claimed is:

1. A safety support system for a tire and rim assembly in which the tire is a tubeless tire having a tread, sidewalls and bead portions mounted on bead seats of a rim comprising a safety support with a toroidal safety support body of resilient foam material for positioning within said tire, said safety support having a predetermined radially outer diameter less than the radially inner diameter of said tire, a pair of reinforcing bead rings positioned at the surface and at each side of said body, at least one ply of reinforcing fabric wrapped around a radially outer wall of said safety support and extending between said bead rings for reinforcing said sidewalls and said outer wall to control expansion of said safety support beyond said outer diameter, said safety support body having a radially inner diameter substantially the same as the diameter of said rim, said resilient foam material of said safety support body containing cells of gas under pressure for expanding said body in an axial direction and exerting an axial force against said bead portions of said tire seated in said bead seats of said rim to provide cushioning and support of said tire and resist circumferential movement of said bead portions of said tire relative to said rim upon deflation of said tire.

2. The safety support system according to claim 1 wherein said rim is of a substantially rigid material and controls expansion of said body beyond said inner diameter of said body.

3. The safety support system according to claim 2 wherein said rim has a drop center configuration with said safety support body having a configuration at a radially inner wall conforming to said drop center configuration.

4. The safety support system according to claim 1 wherein each of said bead rings has a diameter not greater than the diameter of the bead portions of said tire.

5. The safety support system according to claim 1 or 4 wherein said reinforcing fabric of said ply has cords extending in a direction at a bias angle to the circumferential centerplane of said safety support.

6. The safety support system according to claim 1 including at least a second ply of reinforcing fabric wrapped around a radially inner wall of said safety support to control expansion of said safety support beyond said inner diameter for field mounting of said safety support.

7. The safety support system according to claim 6 wherein said reinforcing fabric of said second ply has cords extending in a radial direction at about right angles to said circumferential centerplane of said safety support.

8. The safety support system according to claim 7 wherein circumferential edges of said second ply are disposed in overlapping relationship providing a spliced tubular reinforced liner.

9. The safety support system according to claim 1 wherein said rim is a cylindrical two-piece rim having one of said bead seats on one edge of a first member and a second one of said bead seats on a second member of said rim, and at least one ply of reinforcing fabric wrapped around an inner wall of said safety support between said inner wall and said bead rings to control expansion of said safety support beyond said inner diameter for field mounting of said safety support.

* * * * *